(12) United States Patent
Scalf

(10) Patent No.: US 11,885,555 B2
(45) Date of Patent: Jan. 30, 2024

(54) METHOD AND APPARATUS FOR A DRAIN HARNESS

(71) Applicant: Midea Group Co., Ltd., Foshan (CN)

(72) Inventor: Eric Scalf, Louisville, KY (US)

(73) Assignee: MIDEA GROUP CO., LTD., Guangdong (CN)

(*) Notice: Subject to any disclaimer, the term of this patent is extended or adjusted under 35 U.S.C. 154(b) by 131 days.

(21) Appl. No.: 17/490,152

(22) Filed: Sep. 30, 2021

(65) Prior Publication Data
US 2023/0094240 A1 Mar. 30, 2023

(51) Int. Cl.
*F25D 21/04* (2006.01)
*F25D 21/14* (2006.01)

(52) U.S. Cl.
CPC ........ *F25D 21/14* (2013.01); *F25D 2321/146* (2013.01); *F25D 2400/40* (2013.01)

(58) Field of Classification Search
CPC ............... F25D 21/14; F25D 2321/146; F25D 2400/40; H02G 3/22
See application file for complete search history.

(56) References Cited

U.S. PATENT DOCUMENTS

| | | | |
|---|---|---|---|
| 4,821,530 A | 4/1989 | Ledbetter | |
| 7,736,179 B2 | 6/2010 | Cook et al. | |
| 10,066,868 B2 | 9/2018 | Dolinsek et al. | |
| 10,907,884 B1 | 2/2021 | Scorsim et al. | |
| 10,948,226 B2 | 3/2021 | Bertolini et al. | |
| 2003/0042010 A1 | 3/2003 | Kobayashi | |
| 2011/0192180 A1* | 8/2011 | Henderson | F24D 19/0095 62/156 |
| 2016/0209101 A1* | 7/2016 | Hawley, III | F25D 21/14 |
| 2020/0033049 A1 | 1/2020 | Dherde | |
| 2020/0191466 A1 | 6/2020 | Cho | |

FOREIGN PATENT DOCUMENTS

| | | |
|---|---|---|
| CH | 711097 A2 | 11/2016 |
| CN | 102494476 A | 6/2012 |
| CN | 103017464 A | 4/2013 |
| CN | 203083263 U | 7/2013 |
| CN | 210454634 U | 5/2020 |
| CN | 213278616 U | 5/2021 |
| CN | 213362997 U | 6/2021 |
| JP | 2933835 B2 | 8/1999 |

(Continued)

OTHER PUBLICATIONS

Sears, Refrigerator Drain Tube Grommet WR17X12239, Storeworth.com, Retrieved from: https://storeworth.com/product/Refrigerator-Drain-Tube-Grommet-WR17X12239.html, Retrieved on: Apr. 16, 2021.

(Continued)

*Primary Examiner* — Lionel Nouketcha
(74) *Attorney, Agent, or Firm* — Gray Ice Higdon

(57) ABSTRACT

A drain harness for a device with a drain. The drain harness may define at least a portion of one or more through openings. The drain harness may include one or more electrical wirings. The drain harness may include one or more electrical components. The drain harness may be flexible or flexed between one or more configurations. The drain harness may include one or more caps and/or seal mechanisms.

19 Claims, 5 Drawing Sheets

(56) References Cited

FOREIGN PATENT DOCUMENTS

| JP | 2007038813 A | 2/2007 |
|----|--------------|--------|
| JP | 2008053047 A | 3/2008 |
| KR | 20040025466 A | 3/2004 |
| KR | 100850923 B1 | 8/2008 |
| WO | 2019029441 A1 | 2/2019 |
| WO | WO2021006641 A1 | 1/2021 |
| WO | 2023050759 A1 | 4/2023 |

OTHER PUBLICATIONS

International Search Report and Written Opinion issued in Application No. PCT/CN2022/085454, 8 pages, dated Jun. 27, 2022.
European Patent Office, Partial Supplementary Eruopean Search Report issued in Application No. 22793501.2, 12 pages, dated Sep. 12, 2023.

* cited by examiner

METHOD AND APPARATUS FOR A DRAIN HARNESS

BACKGROUND

The present embodiments relate to a drain harness for a device, more specifically for an appliance.

Users often lay wires across or bridge the gasket sealing surface of a door to position electronics within the refrigerated space. However, this practice may damage the gasket sealing surface, introduce heat or moisture into the refrigerated space, or compromise the temperature control of the refrigerated space. Thus, there is a need to allow flexible positioning of one or more electronic components within a refrigerated space.

SUMMARY

In some embodiments of the invention, for example, a device with a drain may include a housing having a drain, wherein the drain includes a first inlet and a first outlet. In various embodiments, the device may include a drain harness having a harness body, wherein the harness body may include a first end adjacent the first inlet and a second end adjacent the first outlet. In some embodiments, the harness body may define a through opening extending from the first end to the second end, wherein the through opening may include a second inlet adjacent the first end of the harness body and a second outlet adjacent the second end of the harness body, and one or more electrical wirings may extend from the first end to the second end of the harness body. In various embodiments, the device may include an internal cap sealing the second inlet of the harness body through opening. In some embodiments, the device may include an external cap sealing the second outlet of the harness body through opening.

In some embodiments, the harness body may be flexible between an uninstalled configuration and an installed configuration. In various embodiments, the device may include one or more seal mechanisms between at least one of the first inlet of the drain and the first end of the harness body and the first outlet of the drain and the second end of the harness body. In some embodiments, the through opening may be positioned at a lower elevation than the one or more electrical wirings within the harness body. In various embodiments, the device may include one or more electrical components positioned within a refrigerated space of the housing and in electrical communication with the one or more electrical wirings. In some embodiments, an outer periphery of the harness body may include one or more ribs to engage an inner periphery of the drain. In various embodiments, the first inlet of the drain may be in fluid communication with a refrigerated area and the first outlet of the drain may be in fluid communication with an ambient area different from the refrigerated area. In some embodiments, an outer periphery of the through opening may be defined only by the harness body.

In various embodiments, a drain harness may include a flexible harness body having a first end and a second end. In some embodiments, the harness body may define one or more through openings extending from the first end to the second end. In various embodiments, the one or more through openings may define one or more inlets adjacent the first end in fluid communication with one or more outlets adjacent the second end. In various embodiments, the harness body may include one or more electrical wirings extending from the first end to the second end.

In addition, in some embodiments, the drain harness may include at least one of an internal cap and an external cap, wherein the internal cap may seal one or more second inlets of the harness body through opening, and the external cap may seal the one or more second outlets of the harness body through opening. In various embodiments, the one or more electrical wirings may be outside an outer periphery of one or more through openings. In some embodiments, the drain harness may include one or more seal mechanisms sealing an outer periphery of the harness body adjacent at least one of the first end and the second end. In various embodiments, the drain harness may include one or more electrical components in electrical communication with the one or more electrical wirings. In some embodiments, the drain harness may include one or more ribs projecting from an outer periphery of the harness body adjacent at least one of the first end and the second end. In various embodiments, the flexible harness body may be flexible between an uninstalled configuration and an installed configuration different from the uninstalled configuration.

In various embodiments, a method of installing a drain harness within a drain of a device may comprise the steps of providing a device having a drain, wherein the drain includes a first inlet and a first outlet. In some embodiments, the method may include providing a drain harness having a harness body, wherein the harness body may include a first end and an opposing second end, wherein the harness body may define at least one through opening extending from the first end to the second end, wherein at least one through opening may include a second inlet adjacent the first end of the harness body and a second outlet adjacent the second end of the harness body, and one or more electrical wirings may extend from the first end to the second end of the harness body. In various embodiments, the method may include progressively inserting the drain harness through at least one of the first inlet and the first outlet until the first end of the harness body may be adjacent the first inlet of the drain and the second end of the harness body may be adjacent the first outlet of the drain. In some embodiments, the method may include flexing the drain harness between a first configuration when unassembled with the drain of the device to a second configuration when assembled with the drain of the device.

In addition, in some embodiments, the method may include orientating at least one through opening towards a lower extent of the drain. In various embodiments, the method may include sealing at least one of the second inlet and the second outlet of at least one through opening with one or more caps. In some embodiments, the method may include sealing an outer periphery of the harness body to the drain. In various embodiments, the method may include connecting one or more electrical components to one or more electrical wirings of the harness body.

These and other advantages and features, which characterize the embodiments, are set forth in the claims annexed hereto and form a further part hereof. However, for a better understanding of the embodiments, and of the advantages and objectives attained through its use, reference should be made to the Figures and to the accompanying descriptive matter, in which there is described example embodiments. This summary is merely provided to introduce a selection of concepts that are further described below in the detailed description, and is not intended to identify key or essential features of the claimed subject matter, nor is it intended to be used in limiting the scope of the claimed subject matter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 2 is an enlarged view of the embodiment of the drain harness of

FIG. 1;

DETAILED DESCRIPTION

Numerous variations and modifications will be apparent to one of ordinary skill in the art, as will become apparent from the description below. Therefore, the invention is not limited to the specific implementations discussed herein.

The embodiments discussed hereinafter will focus on the implementation of the hereinafter-described techniques and apparatuses within a device and/or appliance (e.g. cooling device) such as refrigerator/freezer appliance 10, or in other similar applications. However, it will be appreciated that the herein-described techniques and apparatuses may also be used in connection with other types of appliances/devices having refrigerated volumes/compartments/spaces (e.g. cooled, frozen, chilled, non-ambient temperatures, etc.) in some embodiments. Further, the herein-described techniques may be used in a variety of applications having one or more drains, conduits, or pathways 12 in some embodiments. Moreover, the herein-described techniques may be used in connection with various freezer appliance configurations. Implementation of the herein-described techniques within side-by-side refrigerators, bottom freezer refrigerators, top freezer refrigerators, wine refrigerators and beverage centers, compact refrigerators, chest freezers, coolers, ice chests/box, ice machines, portable ice chests, air conditioners, water dispenser/cooler, etc. would be well within the abilities of one of ordinary skill in the art having the benefit of the instant disclosure, so the embodiments are not limited to a chest freezer implementation discussed further herein.

Figure 1:
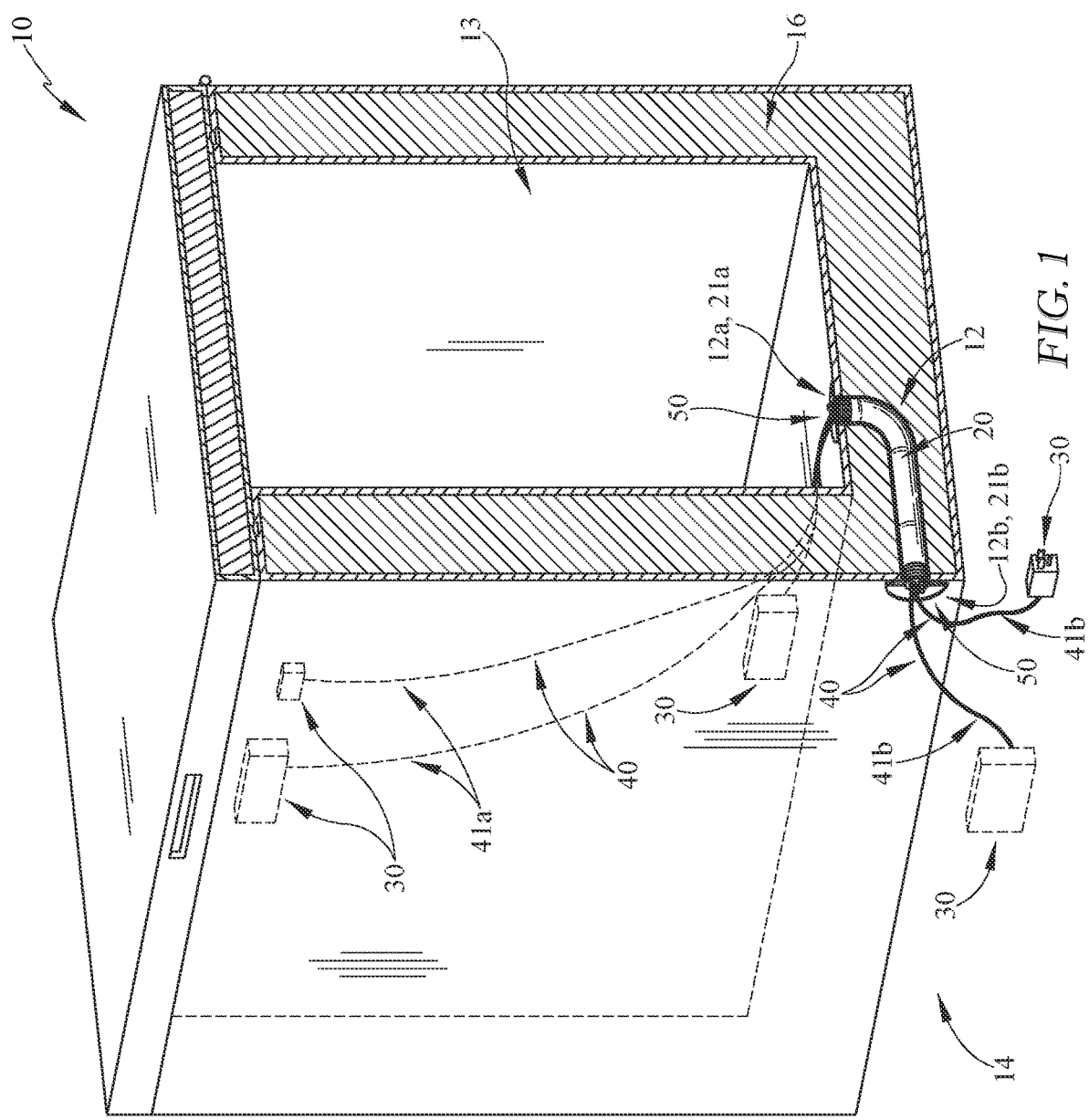
FIG. 1 is a perspective view of one embodiment of a chest freezer utilizing an embodiment of a drain harness within a drain, with portions of the chest freezer broken away illustrating the drain harness in an installed configuration.
Figure 2:
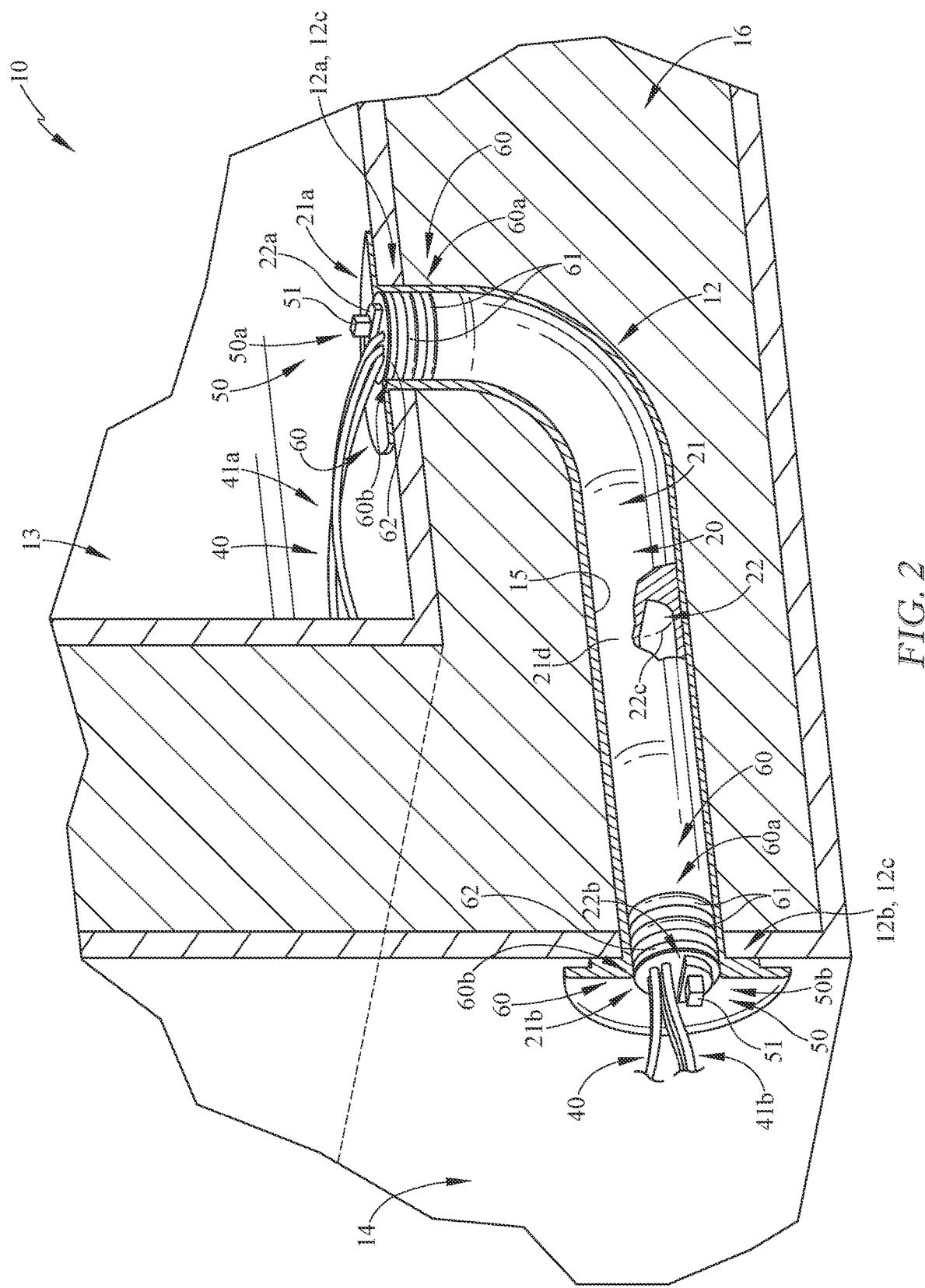
Figure 5:
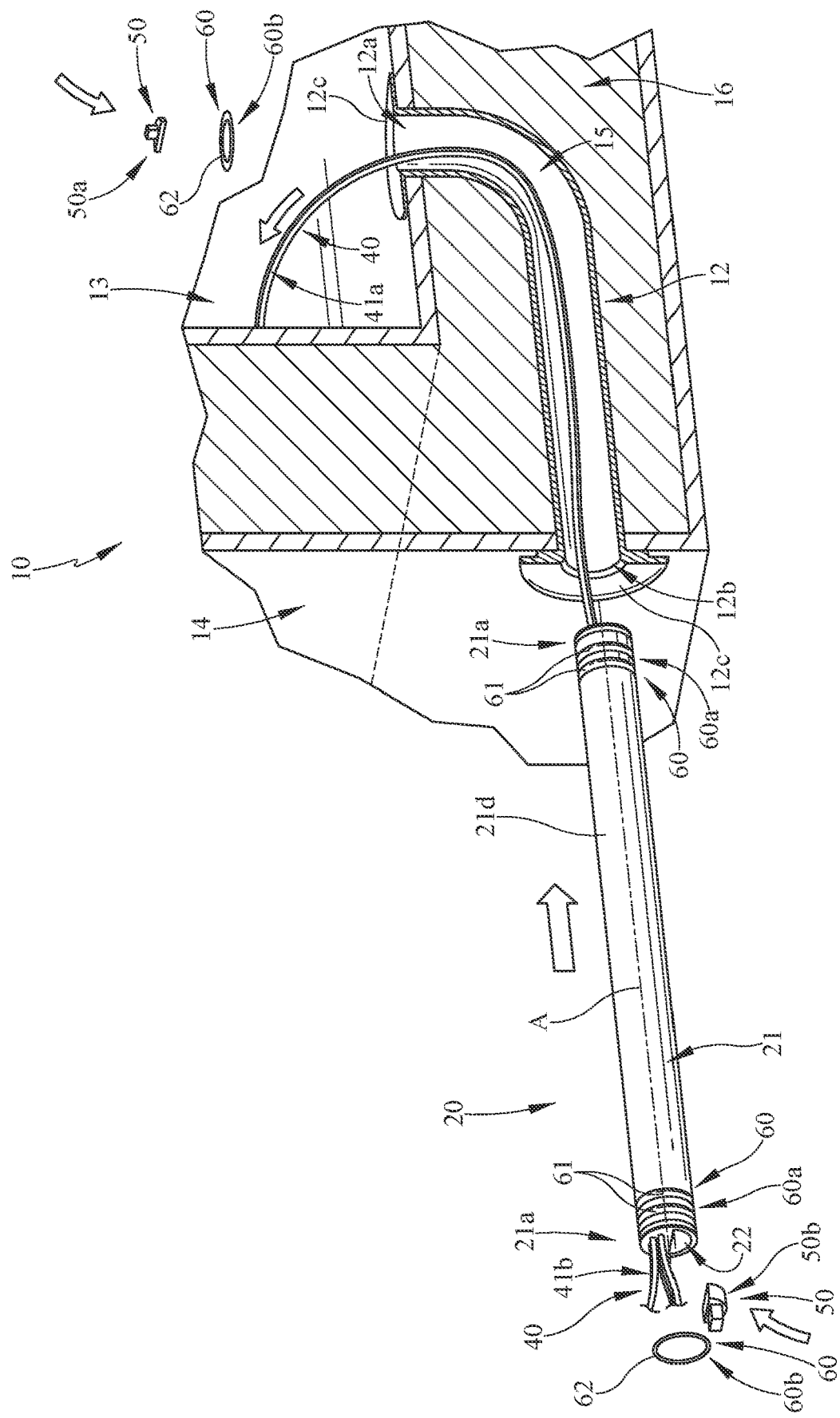
FIG. 5 is a perspective view of the drain harness of FIG. 1, illustrating the drain harness in an uninstalled configuration being inserted into the drain.

In some implementations, a drain harness 20 or portions thereof may be positioned within the drain 12. The drain 12 may be in fluid connection between a first or refrigerated volume/compartment/space/area 13 and a second or ambient volume/compartment/space/area 14 as shown in FIGS. 1, 2, and 5. The drain 12 may be a variety of shapes, sizes, quantities, and constructions. The drain 12 may include an inner periphery defining the through opening or flow channel therein 15. A housing 16 may include the drain 12 positioned or in fluid communication between the one or more compartments (e.g. 13, 14) defined by the housing. The drain 12 may include a first inlet 12a within or adjacent to the first or internal volume 13 and a first outlet 12b within or adjacent to the second or external volume 14.

In some implementations, the device 10 and/or drain harness 20 may allow for electrical passthrough/communication (e.g. electrical wirings, connections, power, communication cables, etc.) and/or draining (e.g. one or more through holes or passages) through the drain harness 20 and/or drain 12 between one or more volumes/compartments (e.g. 13, 14). The device 10 and/or drain harness 20 may drain the contents (e.g. water, fluid) of the one or more compartments connected thereto. One example of draining the contents may be during a defrost (e.g. manual, automatic, etc.). In some implementations as shown in the Figures, the device 10 or drain harness 20 may include one or more electrical components 30 in communication (e.g. electrical) with the drain harness 20 or portions thereof (e.g. the one or more electrical wirings 40 of the drain harness). The one or more electrical components 30 may be positioned in the refrigerated compartment or space 13. The one or more electrical components 30 may be positioned in the ambient space 14. Examples of the electrical components 30 may be lights (e.g. LEDs), cameras, sensors (e.g. temperature, moisture, food quality, food properties, door, humidity, occupancy), fans, controls, WIFI, fans, heaters, displays, controls, user interfaces, etc. The one or more electrical components 30 may be used, provide or communicate user information, may minimize compromising of the compartment and/or contents, and/or function when the compartment 13, 14 (e.g. lid, door) is in a closed and/or open position.

Figure 3:
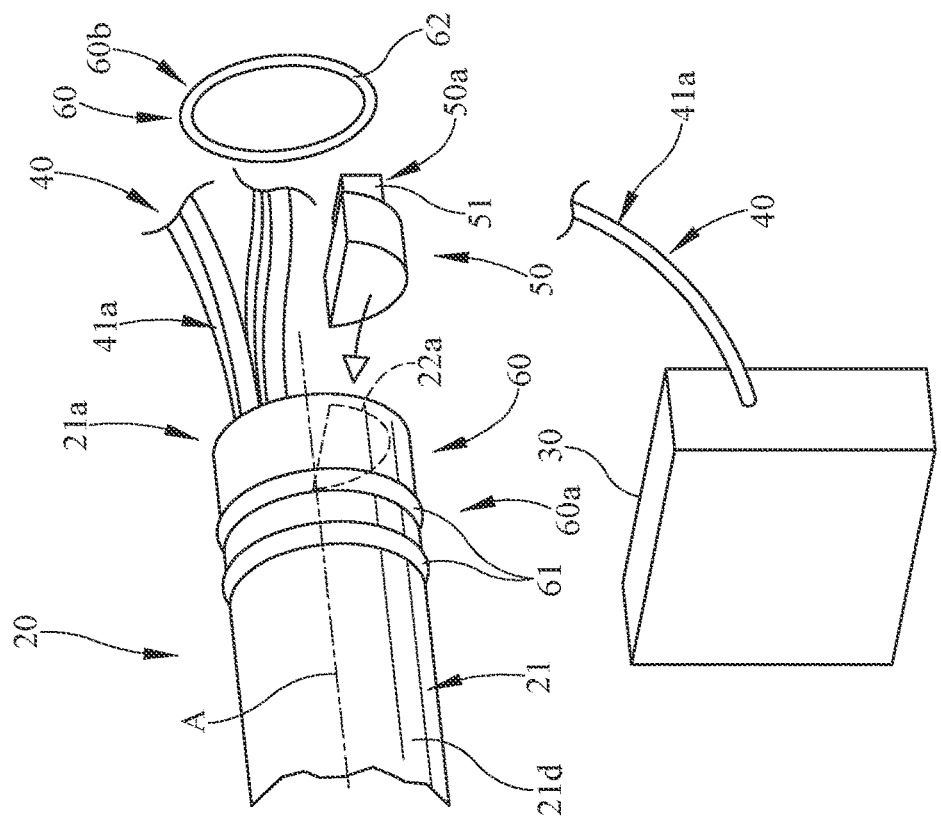
FIG. 3 is an exploded view of the drain harness of FIG. 1.
Figure 3:
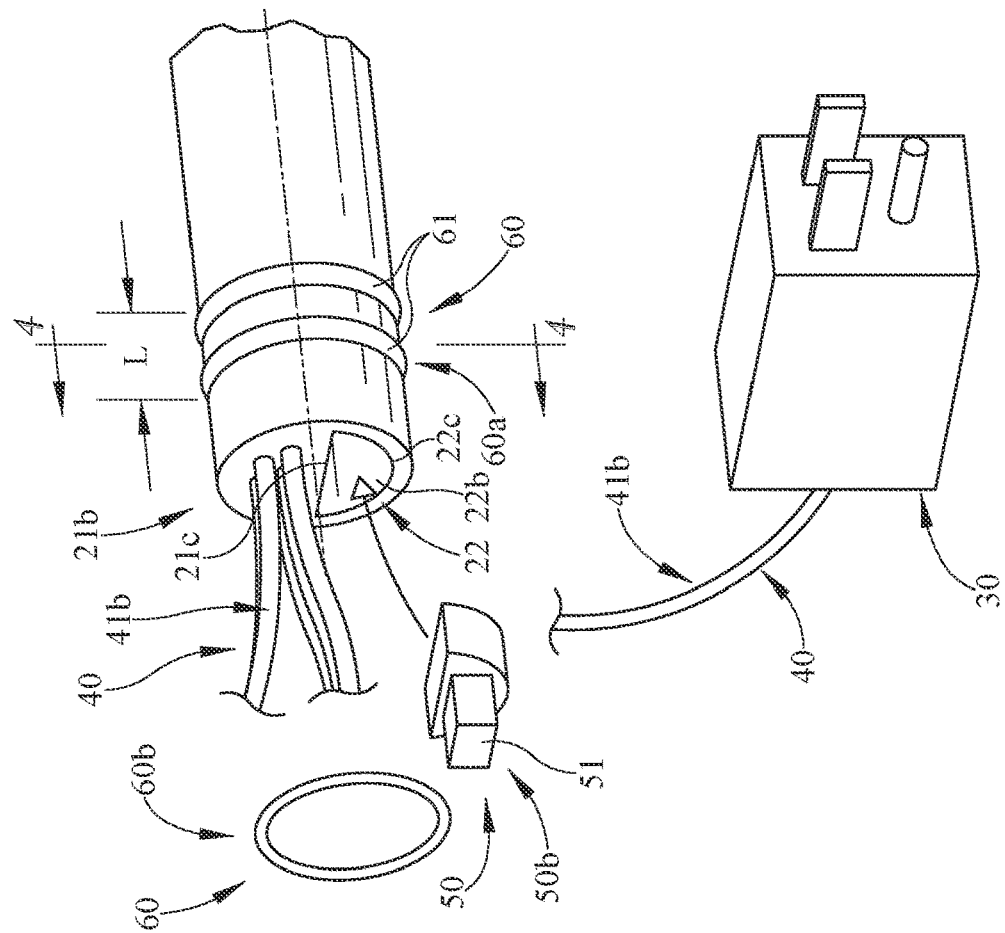
Figure 4:
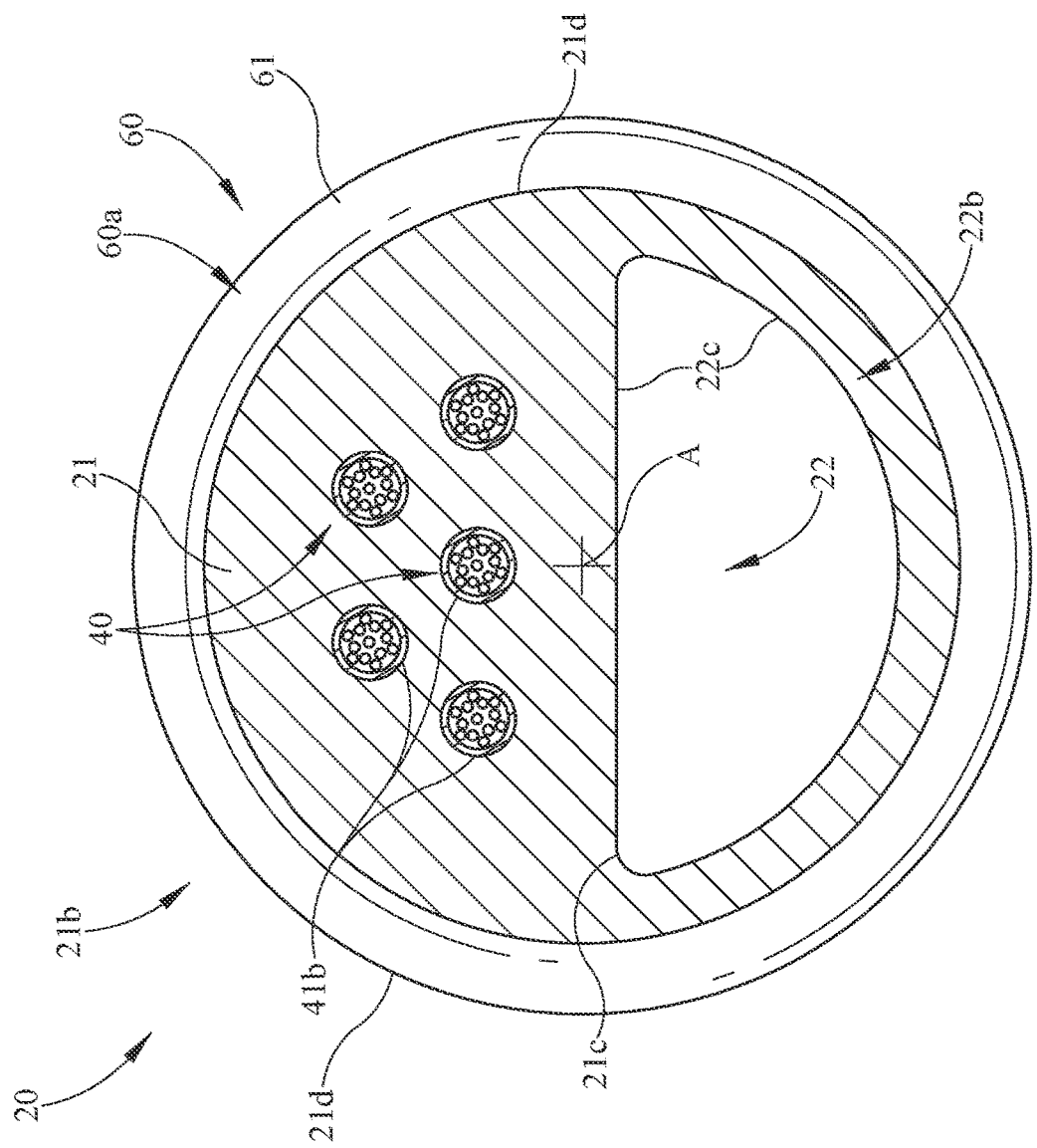
FIG. 4 is a sectional view of the drain harness adjustable bin of FIG. 3 taken along line 4-4.

In some implementations, the drain harness 20 or portions thereof may be configurable and/or flexible between one or more configurations/positions. The drain harness 20 may be positioned or is flexed between one or more positions (e.g. uninstalled, installed, first position, second position, etc.). The drain harness 20 or harness body 21 may be made of one or more materials. The drain harness 20 may be made of a silicone, vinyl, and/or thermoplastic elastomeric material. The drain harness 20 may be overmolded onto the one or more electrical wirings or connections 40, or portions thereof. The drain harness 20 may be overmolded or formed to define the one or more through openings 22, or portions thereof. The drain harness 20 may bend or flex to the shape, orientation, size, angle, design of the drain. The drain harness 20 may flex and/or reshape before, during, and/or after installing. For example, the drain harness may be substantially straight in an uninstalled configuration (see FIGS. 3 and 5) and when in an installed configuration (see FIGS. 1 and 2) the drain harness 20 may be bent/flexed into one or more shapes (e.g. arcuate in shape) different from the uninstalled configuration to correspond to the pathway or inner periphery 15 defined by the drain 12. In some embodiments, the drain harness 20 may be snaked or pushed/pulled from one or more ends 12c (e.g. inlet 12a, outlet 12b) of the drain 12 from an unassembled/unflexed configuration (see FIG. 5) to the assembled/flexed configuration (see FIGS. 1 and 2) (e.g. wherein the opposing ends 21a, 21b of the drain harness 20 are adjacent the corresponding inlet 12a/outlet 12b of the drain). The assembled configuration may be different from the unassembled configuration. The drain harness 20 may be described as rigid or stiff in the axial/longitudinal direction to allow the drain harness to be pushed through the drain 12 while still allowing flexibility in a direction transverse to the longitudinal axis A of the drain harness 20. Further, the drain harness 20 may be compressible (e.g. radially and/or axially) to conform to the inner periphery 15 defining the drain through opening. The drain harness 20, or portions thereof, may compress and/or expand in some embodiments. For example, the drain harness, or portions thereof, may compress (e.g. radially) when installing within the drain and/or subsequently expand to seal, engage, and/or conform to the inner periphery 15 of the drain, or portions thereof. In some implementations, the one or more through openings 22 or portions of the drain harness 20 may be positioned at lower elevation of the drain harness 20 adjacent to the lower portion of the drain 12. This may allow for substantial draining of the contents, or portion thereof, of the housing volume 13 being drained. The one or more through openings 22 may be positioned at a lower elevation than the one or more electrical wirings 40 when in the assembled configuration. Further, the drain harness or portions thereof may be spun or rotated to a particular orientation of one or more portions of the harness relative to or within the drain. For example, to orientate the one or more through openings 22 and/or wirings 40 the user may rotate the through opening 22 adjacent the bottom of the drain 12 during insertion/assembly.

In some implementations, the drain harness 20 may include one or more harness bodies 21. Although the harness body 21 is shown as a single piece in the Figures, it should be understood that the harness body may be two or more pieces installed together or separately. The harness body 21 may be flexible or be described as a flexible harness body. The harness body may be an elongated member extending along the longitudinal axis A in some embodiments. The harness body 21 may include a first end 21a and an opposing second end 21b. The first end 21a of the harness body 21 may be positioned adjacent the first inlet 12a of the drain 12, or portion thereof. The second end 21b of the harness body 21 may be positioned adjacent the first outlet 12b of the drain 12, or portion thereof. The length of the harness body 21 may be a variety of lengths and still be within the scope of the invention. The respective opposing ends (e.g. first end 21a and/or second end 21b) of the harness body 21 may be flush with, project outwardly from, and/or be recessed inwardly from the first outlet 12b and/or first inlet 12a. For example, although the opposing ends (e.g. first end 21a and/or second end 21b) are shown substantially flush with the first outlet 12b and/or first inlet 12a, the second end 21b may project for a distance or length outwardly from the first outlet 12b in some embodiments. The drain harness 20 (e.g. harness body), or portions thereof, may define one or more through openings 22 or drain paths extending from adjacent the first end 21a of the harness body 21 to the second end 21b of the harness body 21. Although there is only a single through opening 22 shown in the one embodiment, the through opening 22 (e.g. inner and/or outer periphery, length, diameter, etc.) may be a variety of sizes, shapes, quantities, and constructions and still be within the scope of the invention. The one or more through openings 22 may be in fluid communication with the inlet 12a and/or outlet 12b of the housing 16 or device 10, or portions thereof. The one or more through openings 22 or harness body 21 may include or define one or more second inlets 22a in fluid communication with one or more second outlets 22b. The one or more second inlets 22a may be positioned adjacent the first inlet 12a of the drain 12 and the one or more second outlets 22b may be positioned adjacent the first outlet 12b of the drain 12. The harness body 21 or drain harness 20, or portions thereof, may define one or more through openings 22 alone or in combination with the drain 12 (e.g. inner periphery 15), or portions thereof. As shown in the one embodiment, the drain harness 20 or harness body 21 (e.g. inner periphery 21c) may define the outer periphery 22c of the one or more through openings 22. Stated alternatively, the through opening 22 may be defined only by the harness body 21 or portions thereof. In other embodiments not shown, the harness body 21 and the drain 12 may define one or more through openings 22. For example, the outer periphery 21d of the harness body 21 may have one or more slots extending the length of the drain harness 20 between the first end 21a and second end 21b such that the slots and the inner periphery 15 of the drain combine to define at least one through opening to allow draining or material to pass therethrough.

In some implementation, the drain harness 20 or harness body 21 may include one or more electrical wirings 40. The one or more electrical wirings 40 may extend from the first end 21a of harness body 21 to the second end 21b of the harness body 21. The one or more electrical wirings 40 may project from or extend away from the harness body 21 (e.g. opposing ends 21a, 21b, outer periphery, inner periphery) in one or more directions. The one or more electrical wirings 40 may be positioned outside an outer periphery 22c of the one or more through openings 22. The one or more electrical wirings 40 may be insulated (e.g. jacket or sleeve) within the harness body 21. The one or more electrical wirings 40 (e.g. first and/or second ends) may include one or more connectors (e.g. male/female, mating devices/couplers, etc.) to connect to one or more electrical components and/or other electrical wirings. A first end 41a of the electrical wirings 40 may be positioned within the refrigerated space 13 and connected to one or more electrical components 30, if used. A second end 41b of the electrical wirings 40 may be positioned outside in the ambient space 14 and connected to one or more electrical components 30, if used, (e.g. power, displays, user interfaces, connections (e.g. male/female connectors). In some embodiments, the second end 41b may be connected to a power outlet as shown in the Figures, external battery, and/or to the power supply of the existing product (e.g. connectors). The electrical components may be the same and/or different in the one or more compartments (e.g. 13, 14) relative to the housing 16 and/or drain harness 20.

In some implementations, the drain harness 20 and/or harness body 21 may include one or more caps or plugs 50. The one or more caps 50 may seal the through opening 22 (e.g. inlet 22a, outlet 22b) defined by the harness body 21 and/or drain 12, or portions thereof, in some embodiments. In the one embodiment shown, the one or more caps 50, if used, may releasably engage the one or more second inlets 22a and/or one or more second outlets 22b of the one or more through openings 22. The one or more caps 50 may seal or sealingly/releasably engage the one or more through openings 22 (e.g. second inlet 22a, second outlet 22b, etc.). The one or more caps 50 may include an internal cap 50a sealing the second inlet 22a or through opening 22 and/or an external cap 50b sealing the second outlet 22b or through opening 22. The one or caps 50 may plug or engage the outer periphery 22c of the one or more through openings 22 and/or ends 21a, 21b of the harness body (e.g. distal and/or proximal end surfaces of the ends) and/or drain. The end caps 50 may include finger/hand grips 51 for the user to disengage and/or engage the drain harness 20, or portions thereof, and/or drain 12. Although not shown, a tool may be used to disengage/engage the caps relative to the harness body and/or drain. The caps 50 may be made of the same or different material than the remaining portion of the harness body. In some embodiments, the caps may be a non-flexible plastic material.

In some implementations, the drain harness 20 and/or harness body 21 may include one or more seal mechanisms 60 sealing the drain harness to the device 10 and/or drain 12, or portions thereof. The one or more seal mechanisms 60 may include a first seal mechanism 60a. The first seal mechanism 60a, if used, may be one or more seals or projections 61 extending from the harness body 21 (e.g. ends, outer periphery 21d). For example, in the one embodiment shown, the first seal mechanism 60a may be one or more projections/ribs 61 projecting from the outer periphery 21d of the drain harness sealingly engaging the outer periphery of the drain. The one or more ribs, if used, may extend about the circumference of the body 21 for a length L, or portions thereof, of the harness body 21 adjacent the first end 21a and/or second end 21b of the drain harness 20, adjacent the first outlet 12b and/or first inlet 12a of the drain 12. Another embodiment of the one or more seal mechanisms 60 may include a second seal mechanism 60b. The second seal mechanism 60b, if used, may be a gasket, O-ring, and/or sealant 62 (e.g. silicone) applied to or assembled between the engagement of the drain harness 20 (e.g. harness body, outer periphery, first end, second end) and the drain 12 (e.g. inner periphery, first inlet, first outlet). For example, in the one embodiment shown, the sealant 62 or second seal mechanism 60b may inserted in the engagement between the first inlet 12a of the drain 12 and the first end 21a of the harness body 21 and/or the first outlet 12b of the drain 12 and the second end 21b of the harness body 21.

In use, the drain harness 20 may be installed within the drain 12 of the device 10 (e.g. cooling device, freezer, etc.) or housing 16. The drain harness 20 (e.g. body 21, wirings 40, and/or caps 50) may be progressively inserted (e.g. pushed, pulled, etc.) through the through opening, inner periphery 15 and/or drain 12, or portion thereof, or at least one of the first inlet 12a and first outlet 12b of the drain 12. If needed, one or more drain plugs not shown may be removed from the drain 12 to allow insertion or use of the drain harness. The harness body 21 may be inserted until the internal cap 50a and/or first end 21a of the harness body 21 is adjacent the first inlet 12a of the drain 12 and/or the external cap 50b and/or second end 21b of the harness body 21 is adjacent the first outlet 12b of the drain 12. The drain harness 20 and/or harness body 21 may be flexed between the first configuration and the second configuration different from the second configuration when being inserted/removed. It should be understood that the configuration may not change in some embodiments or applications. The first configuration may be when the drain harness 20 is unassembled with the drain 12 and the second configuration when the drain harness 20 is assembled with the drain 12. If needed, the drain harness 20 or harness body 21, or portions thereof, may be rotated relative to the drain 12 in order to orient one or more features or structure of the drain harness 20 relative to the drain or device. For example, the through opening 22 may be oriented towards the lower extent or bottom of the drain 12 and/or the one or more wirings 40 may be orientated towards the upper extent of the drain. One or more caps 50 may be used to seal the second inlet 22a and/or second outlet 22b of the harness body 21 (e.g. though opening 22). The one or more caps 50 may be sealed, inserted, or plugged into the one or more through openings 22 to seal the drain harness 20 and/or device 10 before and/or after assembly of the drain harness 20 with the drain 12/device 10. The outer periphery 21d of the drain harness 20 or body 21 may be sealed with one or more seal mechanisms 60. For example, a sealant or gasket 62 or second seal mechanism 60b, if used, may be added to the engagement between the drain harness 20 and the drain 12/housing 16/device 10. Moreover, the one or more ribs 61 or first seal mechanism 60a, if used, may engage the inner periphery 15 of the drain 12. Further, the one or more ends 41a, 41b of the one or more electrical wirings 40 may be connected to one or more electrical components 30 in a variety of applications. If the device 10 needs to be drained, the one or more caps 50 may be temporarily removed from the drain harness 20, or portions thereof. The one or more electrical wirings 40 may communicate through the drain 12 and/or drain harness 20 into one or more compartments 13 while allowing the ability to drain the one or more compartments 13 of a fluid or material.

While several embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

It is to be understood that the embodiments are not limited in its application to the details of construction and the arrangement of components set forth in the description or illustrated in the drawings. The invention is capable of other embodiments and of being practiced or of being carried out in various ways. Unless limited otherwise, the terms "connected," "coupled," "in communication with," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several embodiments of the invention has been presented for purposes of illustration. It is not intended to be exhaustive or to limit the invention to the precise steps and/or forms disclosed, and obviously many modifications and variations are possible in light of the above teaching.

The invention claimed is:

1. A device with a drain comprising:
    a housing having a drain, wherein the drain includes a first inlet and a first outlet;
    a drain harness having a harness body, wherein the harness body includes a first end adjacent the first inlet and a second end adjacent the first outlet;
    wherein the harness body defines a through opening extending from the first end to the second end, wherein the through opening includes a second inlet adjacent the first end of the harness body and a second outlet adjacent the second end of the harness body, and one or more electrical wirings extending from the first end to the second end of the harness body;
    an internal cap sealing the second inlet of the harness body through opening; and
    an external cap sealing the second outlet of the harness body through opening.

2. The device of claim 1 wherein the harness body is flexible between an uninstalled configuration and an installed configuration.

3. The device of claim 1 further comprising one or more seal mechanisms between at least one of the first inlet of the drain and the first end of the harness body and the first outlet of the drain and the second end of the harness body.

4. The device of claim 1 wherein the through opening is positioned at a lower elevation than the one or more electrical wirings within the harness body.

5. The device of claim 1 further comprising one or more electrical components positioned within a refrigerated space of the housing and in electrical communication with the one or more electrical wirings.

6. The device of claim 1 wherein an outer periphery of the harness body includes one or more ribs to engage an inner periphery of the drain.

7. The device of claim 1 wherein the first inlet of the drain is in fluid communication with a refrigerated area and the first outlet of the drain is in fluid communication with an ambient area different from the refrigerated area.

8. The device of claim 1 wherein an outer periphery of the through opening is defined only by the harness body.

9. A drain harness comprising:
    a flexible harness body having a first end and a second end;
    wherein the harness body defines one or more through openings extending from the first end to the second end, wherein the one or more through openings defines one or more inlets adjacent the first end and one or more outlets adjacent the second end, and wherein the one or more inlets are in fluid communication with the one or more outlets;
    wherein the harness body includes one or more electrical wirings extending from the first end to the second end;
    an internal cap sealing the one or more inlets of the harness body through opening; and
    an external cap sealing the one or more outlets of the harness body through opening.

10. The drain harness of claim 9 wherein the one or more electrical wirings is outside an outer periphery of the one or more through openings along a length of the flexible harness body from the first end to the second end.

11. The drain harness of claim 9 further comprising one or more seal mechanisms sealing an outer periphery of the harness body adjacent at least one of the first end and the second end.

12. The drain harness of claim 9 further comprising one or more electrical components in electrical communication with the one or more electrical wirings.

13. The drain harness of claim 9 further comprising one or more ribs projecting from an outer periphery of the harness body adjacent at least one of the first end and the second end.

14. The drain harness of claim 9 wherein the flexible harness body is flexible between an uninstalled configuration and an installed configuration different from the uninstalled configuration.

15. A method of installing a drain harness within a drain of a device comprising the steps of:
 providing a device having a drain, wherein the drain includes a first inlet and a first outlet;
 providing a drain harness having a harness body, wherein the harness body includes a first end and an opposing second end, wherein the harness body defines at least one through opening extending from the first end to the second end, wherein the at least one through opening includes a second inlet adjacent the first end of the harness body and a second outlet adjacent the second end of the harness body, and one or more electrical wirings extending from the first end to the second end of the harness body;
 progressively inserting the drain harness through at least one of the first inlet and the first outlet until the first end of the harness body is adjacent the first inlet of the drain and the second end of the harness body is adjacent the first outlet of the drain; and
 flexing the drain harness between a first configuration when unassembled with the drain of the device to a second configuration when assembled with the drain of the device.

16. The method of claim 15 further comprising the step of orientating the at least one through opening towards a lower extent of the drain.

17. The method of claim 15 further comprising the step of sealing at least one of the second inlet and the second outlet of the at least one through opening with one or more caps.

18. The method of claim 15 further comprising the step of sealing an outer periphery of the harness body to the drain.

19. The method of claim 15 further comprising the step of connecting one or more electrical components to the one or more electrical wirings of the harness body.

* * * * *